United States Patent
Jiang

(10) Patent No.: US 6,888,816 B2
(45) Date of Patent: May 3, 2005

(54) WINDOW-BASED POLLING SCHEME FOR A WIRELESS COMMUNICATIONS PROTOCOL

(75) Inventor: Sam Shiaw-Shiang Jiang, Hsin-Chu (TW)

(73) Assignee: ASUSTeK Computer Inc., Taipei (TW)

( * ) Notice: Subject to any disclaimer, the term of this patent is extended or adjusted under 35 U.S.C. 154(b) by 878 days.

(21) Appl. No.: 09/822,238

(22) Filed: Apr. 2, 2001

(65) Prior Publication Data
US 2002/0142731 A1 Oct. 3, 2002

(51) Int. Cl.$^7$ .................... H04L 12/403; H04L 12/423
(52) U.S. Cl. .................... 370/346; 370/449; 370/496
(58) Field of Search ............... 370/231, 235, 370/236, 252, 328, 338, 346, 394, 449, 469, 467, 496

(56) References Cited

U.S. PATENT DOCUMENTS 5,896,561 A * 4/1999 Schrader et al. .......... 370/445
6,640,268 B1 * 10/2003 Kumar .................. 710/46
6,697,331 B1 * 2/2004 Riihinen et al. ......... 370/236
6,721,285 B1 * 4/2004 Carro .................. 370/277

* cited by examiner

Primary Examiner—Chi Pham
Assistant Examiner—Anh-Vu H Ly
(74) Attorney, Agent, or Firm—Winston Hsu

(57) ABSTRACT

A transmitter is capable of transmitting layer 2 protocol data units (PDUs). Each PDU has an n-bit sequence number. A base sequence number VT(A) is obtained that marks a beginning sequence number of a transmitting window of the transmitter. A current sequence number VT(S) is obtained that marks a sequence number of a PDU that is next to be transmitted by the transmitter. $2^n$ is added to a difference of the current sequence number VT(S) and the base sequence number VT(A) to yield a first value. A second value is obtained that is a modulus of the first value with $2^n$. A test value is then obtained that is the second value divided by a size of the transmitting window. Polling is triggered when the test value is greater than or equal to a polling value. The polling value represents a percentage of the transmitting window that has been transmitted.

7 Claims, 6 Drawing Sheets

US 6,888,816 B2

WINDOW-BASED POLLING SCHEME FOR A WIRELESS COMMUNICATIONS PROTOCOL

BACKGROUND OF THE INVENTION

1. Field of the Invention

The present invention relates to a wireless communications protocol. More specifically, the present invention discloses a method and system that properly triggers a polling operation for a transmitter to request a receiving status of a receiver.

2. Description of the Prior Art

The surge in public demand for wireless communication devices has placed pressure upon industry to develop increasingly sophisticated communications standards. The $3^{rd}$ Generation Partnership Project (3GPP™) is an example of such a new communications protocol. Such standards utilize a three-layer approach to communications. Please refer to FIG. 1. FIG. 1 is a block diagram of the three layers in such a communications protocol. In a typical wireless environment, a first station 10 is in wireless communications with one or more second stations 20. An application 13 on the first station 10 composes a message 11 and has it delivered to the second station 20 by handing the message 11 to a layer 3 interface 12. The layer 3 interface 12 may also generate layer 3 signaling messages 12a for the purpose of controlling layer 3 operations between the first station 10 and the second station 20. An example of such a layer 3 signaling message is a request for ciphering key changes, which are generated by the layer 3 interfaces 12 and 22 of both the first and the second stations, respectively. The layer 3 interface 12 delivers either the message 11 or the layer 3 signaling message 12a to a layer 2 interface 16 in the form of layer 2 service data units (SDUs) 14. The layer 2 SDUs 14 may be of any length. The layer 2 interface 16 composes the SDUs 14 into one or more layer 2 protocol data units (PDUS) 18. Each layer 2 PDU 18 is of a fixed length, and is delivered to a layer 1 interface 19. The layer 1 interface 19 is the physical layer, transmitting data to the second station 20. The transmitted data is received by the layer 1 interface 29 of the second station 20 and reconstructed into one or more PDUs 28, which are passed up to the layer 2 interface 26. The layer 2 interface 26 receives the PDUs 28 and builds up one or more layer 2 SDUs 24. The layer 2 SDUs 24 are passed up to the layer 3 interface 22. The layer 3 interface 22, in turn, converts the layer 2 SDUs 24 back into either a message 21, which should be identical to the original message 11 that was generated by the application 13 on the first station 10, or a layer 3 signaling message 22a, which should be identical to the original signaling message 12a generated by the layer 3 interface 12 and which is then processed by the layer 3 interface 22. The received message 21 is passed to an application 23 on the second station 20.

Of particular interest is the layer 2 interface, which acts as a buffer between the relatively high-end data transmission and reception requests of the applications, and the low-level requirements of the physical transmission and reception process. Please refer to FIG. 2. FIG. 2 is a diagram of a transmission/reception process from a layer 2 perspective. A layer 2 interface 32 of a transmitter 30, which may be either a base station or a mobile unit, receives a string of layer 2 SDUs 34 from a layer 3 interface 33. The layer 2 SDUs 34 are sequentially ordered from 1 to 5, and are of an unequal length. The layer 2 interface 32 converts the string of layer 2 SDUs 34 into a string of layer 2 PDUs 36. The layer 2 PDUs 36 are sequentially ordered from 1 to 4, and are all of an equal length. The string of layer 2 PDUs 36 is then sent off to the layer 1 interface 31 for transmission. A reverse process occurs at the receiver end 40, which may also be either a base station or a mobile unit, with a receiver layer 2 interface 42 converting a received string of layer 2 PDUs 46 into a received string of layer 2 SDUs 44. Under certain transport modes, the multi-layered protocol insists that the receiver layer 2 interface 42 present the layer 2 SDUs to the layer 3 interface 43 in order. That is, the layer 2 interface 42 must present the SDUs 44 to the layer 3 interface 43 in the sequential order of the SDUs 44, beginning with SDU 1 and ending with SDU 5. The ordering of the SDUs 44 may not be scrambled, nor may a subsequent SDU be delivered to layer 3 until all of the prior SDUs have been delivered.

In line transmissions, such a requirement is relatively easy to fulfill. In the noisy environment of wireless transmissions, however, the receiver 40, be it a base station or a mobile unit, often misses data. Some layer 2 PDUs in the received string of PDUs 46 will therefore be missing. Thus, ensuring that the layer 2 SDUs 44 are presented in order can pose a significant challenge. Wireless protocols are carefully designed to address such problems. Generally speaking, there are two broad modes for transmitting and receiving data: acknowledged mode, and unacknowledged mode (UM). For acknowledged mode data, the receiver 40 sends a special layer 2 acknowledging signal to the transmitter 30 to indicate successfully received layer 2 PDUs 46. No such signaling is performed for UM data. For purposes of the present invention, only acknowledged mode data is considered. Please refer to FIG. 3 with reference to FIG. 1. FIG. 3 is a simplified block diagram of an acknowledged mode data PDU 50, as defined in the 3GPP™ TS 25.322 specification. In general, there are two types of PDUs: a control PDU or a data PDU. Control PDUs are used by the layer 2 interfaces 16 and 26 to control data transmission and reception protocols, such as the above-mentioned layer 2 acknowledging signal. This is somewhat analogous to the exchange of the signaling messages 12a and 22a of the layer 3 interfaces 12 and 22. However, the layer 2 interfaces 16 and 26 do not interpret or recognize the layer 3 signaling messages 12a and 22a, whereas the layer 2 interfaces 16 and 26 do recognize layer 2 control PDUs, and do not hand layer 2 control PDUs up to the layer 3 interfaces 12 and 22. Data PDUs are used to transmit acknowledged mode data, which is then reassembled and presented to layer 3. The example PDU 50 is a data PDU, and is divided into several fields, as defined by the layer 2 protocol.

The first field 51 is a single bit indicating that the PDU 50 is either a data or a control PDU. As the data/control bit 51 is set (i.e., equal to 1), the PDU 50 is marked as an acknowledged mode data PDU. The second field 52 is a sequence number field, and is twelve bits long. Successive PDUs 18, 28 have successively higher sequence numbers, and in this way the second station 20 can properly reassembled layer 2 PDUs 28 to form layer 2 SDUs 24. That is, if a first PDU 18 is transmitted with a sequence number equal to 536, a next PDU 18 would be transmitted with a sequence number equal to 537, and so forth. A single polling bit 53 follows the sequence number field 52, and when set indicates that the receiver (i.e., the second station 20) should respond with an acknowledgment status PDU, which is one kind of control PDU, and which will be introduced later. The first station 10 sets the polling bit 53 to 1 to request the second station 20 to send an acknowledgment status control PDU. Bit 54 is reserved and is set to zero. The next bit 55a is an extension bit, and when set indicates the presence of a following length indicator (LI). An LI may be either 7 bits long or 15 bits long, and is used to indicate the ending position of a layer 2 SDU within the layer 2 PDU 50. If a single SDU completely fills the data region 58 of the PDU 50, then the bit 55*a* would be zero, thereby indicating that no LI is present. In the example PDU 50, however, there are two layer 2 SDUs ending in the layer 2 PDU 50: SDU__1 57*a* and SDU__2 57*b*. There must, therefore, be two LIs to indicate the respective ends of the SDU__1 57*a* and the SDU__2 57*b*. A PDU following the PDU 50 would hold the LI for SDU__3 57*c*. The first LI, $LI_1$, is in field 56*a* following the extension bit field 55*a*, and marks the end of the SDU__1 57*a*. $LI_1$ 56*a* has an extension bit 55*b* that is set, indicating the presence of another LI, $LI_2$ in field 56*b*. $LI_2$ 56*b* indicates the ending position of the SDU__2 57*b*, and has an extension bit 55*c* that is cleared, signifying that there are no more LIs, and that the data region 58 is thus beginning.

Please refer to FIG. 4 with reference to FIG. 3. FIG. 4 is a simplified block diagram of a receiver 64 and a transmitter 65 in a wireless communications system 60. Both the receiver 64 and the transmitter 65 have windows within which they expect to receive the PDUs 50 and transmit the PDUs 50, respectively. The receiver 64 has a receiving window 61 that is delimited by two state variables: VR(R) 62, and VR(MR) 63. VR(R) 62 marks the beginning of the receiving window 61, and VR(MR) 63 marks the end of the receiving window 61. The receiver 64 will only accept PDUs 50 that have sequence numbers 52 that are sequentially on or after VR(R) 62 and sequentially before VR(MR) 63. The sequence number value held in VR(MR) 63 is not considered to be within the receiving window 61. Similarly, the transmitter 65 has a transmitting window 66 that is delimited by two state variables: VT(A) 67 and VT(MS) 68. VT(A) 67 marks the beginning of the transmitting window 66, and VT(MS) 68 marks the end of the transmitting window 66. The transmitter 65 will only transmit PDUs 50 that have sequence numbers 52 that are within the range of the transmitting window 66, i.e., that are sequentially on or after VT(A) 67, and sequentially before VT(MS) 68.

The receiving window 61 has a fixed receiving window size. The receiving window size is simply the number of sequence number values spanned by the state variables VR(R) 62 and VR (MR) 63. That is, VR(MR) 63 is always kept a fixed sequence number value distance away from VR(R) 62, which may be represented mathematically as:

$$VR(MR) = VR(R) + \text{receiving window size} \qquad (1)$$

Note that, as the sequence number 52 is a 12-bit number, equation (1) is a true 12-bit addition, and thus will suffer from rollover on overflow. Consequently, VR(MR) 63 does not always contain a value that is numerically larger than VR(R) 62. Similarly, the transmitting window 66 has a transmitting window size state variable VT(WS) 66*a*, which indicates the number of sequence number values spanned by the state variables VT(A) 67 and VT(MS) 68. The state variable VT(WS) 66*a* has an initial value that is set to a configured transmitting window size, which is supplied by layer 3. As above, this may be represented mathematically as:

$$VT(MS) = VT(A) + VT(WS) \qquad (2)$$

And again, the result from equation (2) may suffer from rollover due to overflow. The receiver 64 may explicitly request the transmitter 65 to change the value of VT(WS) 66*a*. The requested value of VT(WS) 66*a*, however, cannot be greater than the original configured transmitting window size.

As the receiver 64 receives PDUs 50 from the transmitter 65, the receiver 64 will update that value of the state variable VR(R) 62 to reflect the sequentially earliest sequence number 52 before which all preceding PDUs 50 have been successfully received. Put another way, VR(R) 62 always holds the sequence number 52 of the sequentially earliest PDU 50 that the receiver 64 is waiting to receive. Upon the successful reception of this PDU 50, the receiver 64 advances the state variable VR(R) 62 to the sequence number value 52 of the next PDU 50 that needs to be received, and the state variable VR(MR) 63 is updated using equation (1) accordingly. In this manner, the receiving window 61 is advanced by the receiver 64 as the PDUs 50 stream in from the transmitter 65. It should also be noted that the transmitter 65 may explicitly request the receiver 64 to advance the receiving window 61 with a layer 2 signaling PDU, but this has no bearing on the present invention.

The transmitting window 66 is advanced when the transmitter 65 receives a layer 2 acknowledgment status PDU from the receiver 64. The layer 2 acknowledgment status PDU holds the most current value of the state variable VR(R) 62, and is sent at periodic intervals by the receiver 24, or in response to an explicit request from the transmitter 65. The transmitter 65 will then set the state variable VT(A) 67 equal to the value held in the acknowledgment status PDU, which in effect sets VT(A) 67 equal to VR(R) 62. The transmitter 65 updates the state variable VT(MS) 68 using equation (2) accordingly. In this manner, the transmitting window 66 and the receiving window 61 move forward with each other in lock step.

The transmitter 65 has an additional state variable VT(S) 69. When the transmitter 65 begins transmitting the PDUs 50 that lie within the transmitting window 66, the transmitter 65 begins with a PDU 50 having a sequence number 52 given by the state variable VT(A) 67, and works sequentially forward until it reaches a PDU 50 having a sequence number 52 that is just prior to VT(MS) 68. That is, the transmitter 65 transmits the PDUs 50 in sequence, beginning at VT(A) 67 and ending at VT(MS)−1. The state variable VT(S) 69 holds the sequence number 52 of the next PDU 50 to be transmitted. Thus, the PDUs 50 with sequence numbers 52 on or sequentially after VT(A), and on or sequentially before VT(S)−1 have been transmitted at least one time, and are stored in a retransmission buffer 66*b* until they are acknowledged by the receiver 64 by way of an acknowledgment status PDU. Note that if a PDU 50 with a sequence number 52 equal to VT(A) 67 is acknowledged, VT(A) 67 is updated to the next sequentially earliest sequence number value within the retransmission buffer 66*b*. PDUs 50 with sequence numbers 52 on or after VT(S) 69 have not yet been transmitted by the transmitter 69.

To insure that the transmitting window 66 advances, the transmitter 65 must, at intervals, request the receiver 64 to send an acknowledgment status PDU. This is termed polling, and is implemented by way of the polling bit 53. When the transmitter 65 determines that it is time to poll the receiver 64, the transmitter 65 will send the next outgoing PDU 50, i.e., the PDU 50 indicated by the state variable VT(S) 69, with the polling bit 53 set to one. Upon reception of this PDU 50 with the polling bit 53 set, the receiver 64 will respond by sending an acknowledgment status PDU. The acknowledgment status PDU will contain the most recent value of the state variable VR(R) 62, which the transmitter 65 will subsequently use for the state variable VT(A) 67 to advance the transmitting window 66. Various methods may be used by the transmitter 65 to determine when to poll the receiver 64. The transmitter 65 may, for example, use timer-based polling, in which polling is performed at regular, periodic intervals. Alternatively, the transmitter 65 may use window-based polling, in which the transmitter 65 polls the receiver 64 when a certain percentage of the transmitting window 66 has been transmitted.

For window-based polling, the prior art utilizes the following equation to determine if polling should be triggered:

$$t=1-\{(VT(WS)+VT(MS)-VT(S)-1)\bmod VT(WS)\}/VT(WS) \qquad (3)$$

In the above equation (3), "mod" indicates the modulus operation, which returns the remainder of a division operation. The value of t is compared against a polling value, and if t exceeds the polling value then a polling event is triggered by the transmitter 65. The polling value indicates a percentage of the transmitting window 66 that has been transmitted. The polling value is a supplied value and may be set, for example, by layer 3. Unfortunately, equation (3) returns incorrect results for the transmission percentage of the transmitting window 66. As an example of this, consider the following case: VT(WS)=2, VT(MS)=2, and VT(S)=0. This is a condition when the transmitting window 66 has a size of 2, and has not yet transmitted any PDUs 50 within the transmitting window 66. In this case, the transmission percentage should be zero, but equation (3) returns a value of:

$$t=1-\{(2+2-0-1)\bmod 2\}/2=0.50$$

Consequently, equation (3) indicates that the transmission percentage is 50%. If the polling value is 30%, then equation (3) will cause the transmitter 65 to poll the receiver 64 before polling is actually required. Indeed, for the above example with the state variable VT(WS) 66a equal to 2, and the polling value set to 30%, equation (3) will cause the transmitter 65 to poll the receiver 64 with every sent PDU 50. The receiver 64 will thus continuously send acknowledgment status PDUs, which may significantly impair the overall transmission efficiency of the wireless communications system 60. Equation (3) will also return incorrect transmission percentages that may cause unwanted polls to be triggered when the state variable VT(MS) 68 has cycled through 4095, thus overflowing and returning back to zero, and VT(S) 69 has not yet cycled past 4095. That is to say, overflow of the 12-bit sequence numbers held within the state variables VT(MS) 68 and VT(S) 69 can lead to unwanted triggering of polling.

SUMMARY OF THE INVENTION

It is therefore a primary objective of this invention to provide a method for determining triggering of a polling request in a wireless communications protocol for a transmitter.

Briefly summarized, the preferred embodiment of the present invention discloses a transmitter capable of transmitting layer 2 protocol data units (PDUs). Each PDU has an n-bit sequence number. A base sequence number VT(A) is obtained that marks a beginning sequence number of a transmitting window of the transmitter. A current sequence number VT(S) is obtained that marks a sequence number of a PDU that is next to be transmitted by the transmitter. $2^n$ is added to a difference of the current sequence number VT(S) and the base sequence number VT(A) to yield a first value. A second value is obtained that is a modulus of the first value with $2^n$. A test value is then obtained that is the second value divided by a size of the transmitting window. Polling is triggered when the test value is greater than or equal to a polling value. The polling value represents a percentage of the transmitting window that has been transmitted.

It is an advantage of the present invention that the test value accurately returns the percentage of the transmitting window that has been transmitted. Consequently, erroneous polls are avoided, and desired polls are assured.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

In the following description, a communications protocol as disclosed in the 3GPP™ specification TS 25.322, V3.5.0, is used by way of example. However, it should be clear to one in the art that any wireless communications protocol that requires polling to acknowledge the reception of transmitted data may utilize the poll-triggering method of the present invention. It should be further noted that transmitters and receivers in the following detailed description can include cellular telephones, personal data assistants (PDAs), personal computers (PCs), or any other devices that utilize a wireless communications protocol.

It is the method of the present invention to determine triggering of a polling request for a transmitter by using the following equation:

$$t=\{(2^n+VT(S)-VT(A))\bmod 2^n\}/VT(WS) \qquad (4)$$

Figure 1:
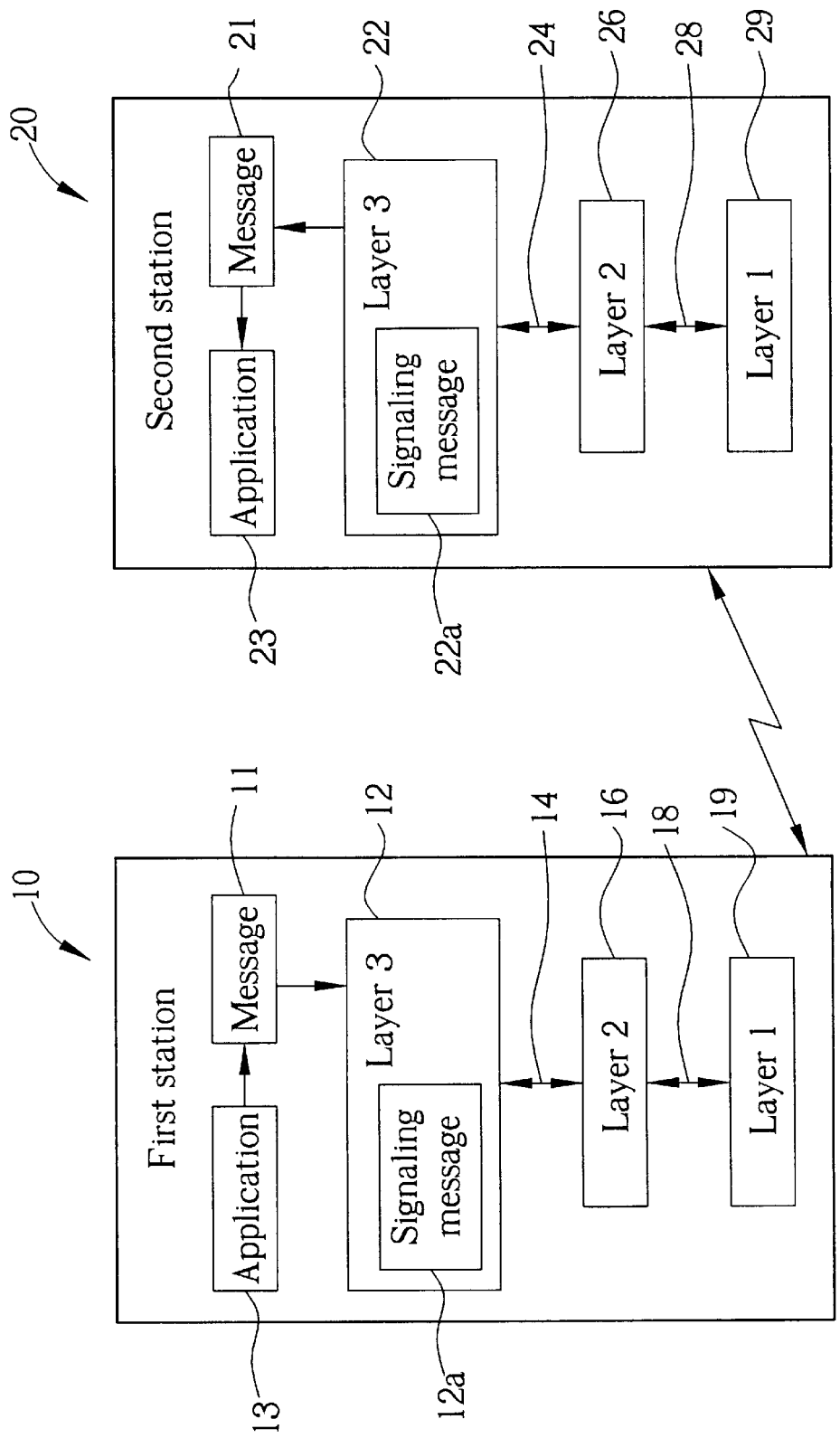
FIG. 1 is a block diagram of a three-layer communications protocol.
Figure 2:
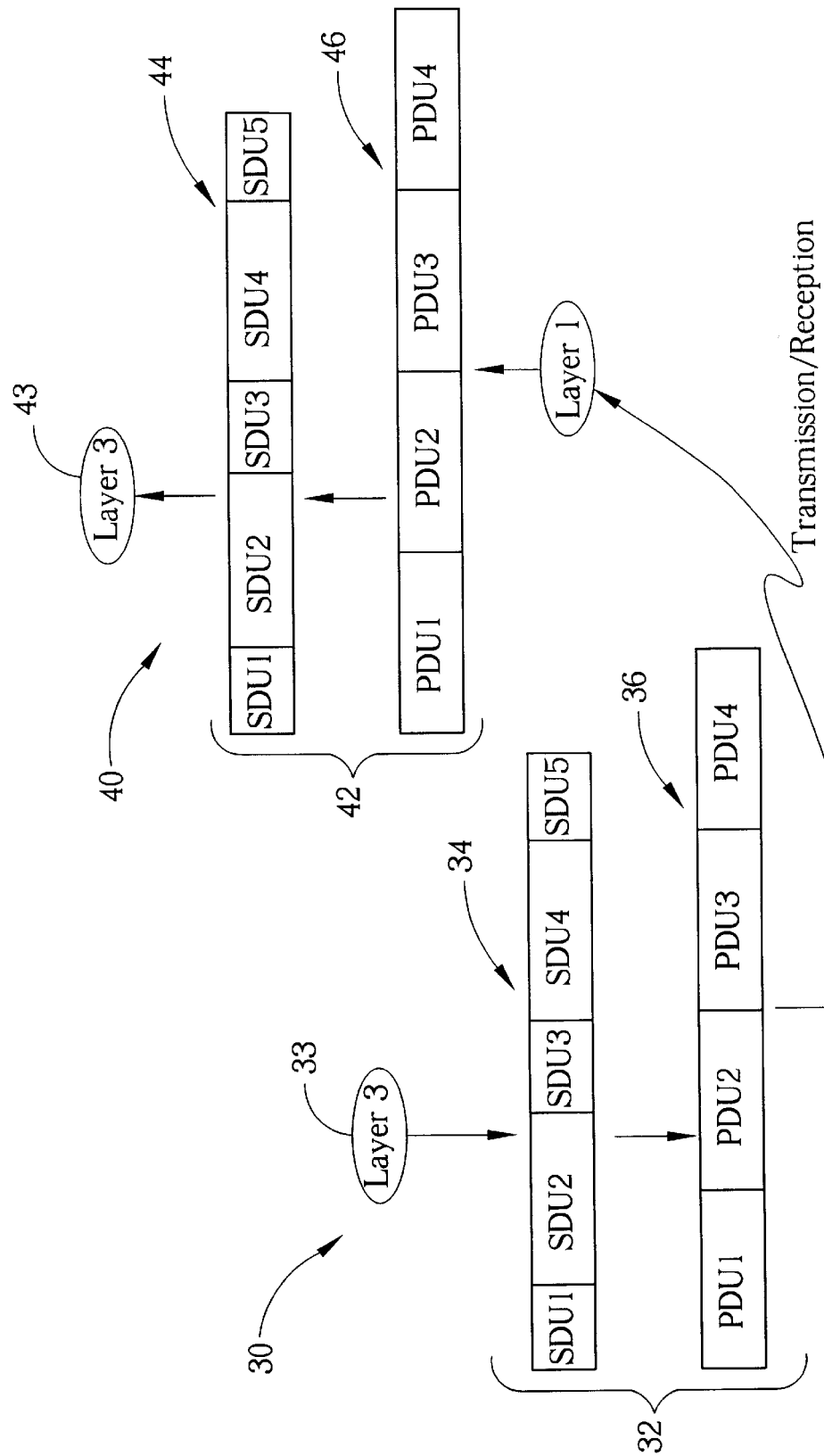
FIG. 2 is a simplified diagram of a transmission/reception process from a layer 2 perspective.
Figure 3:
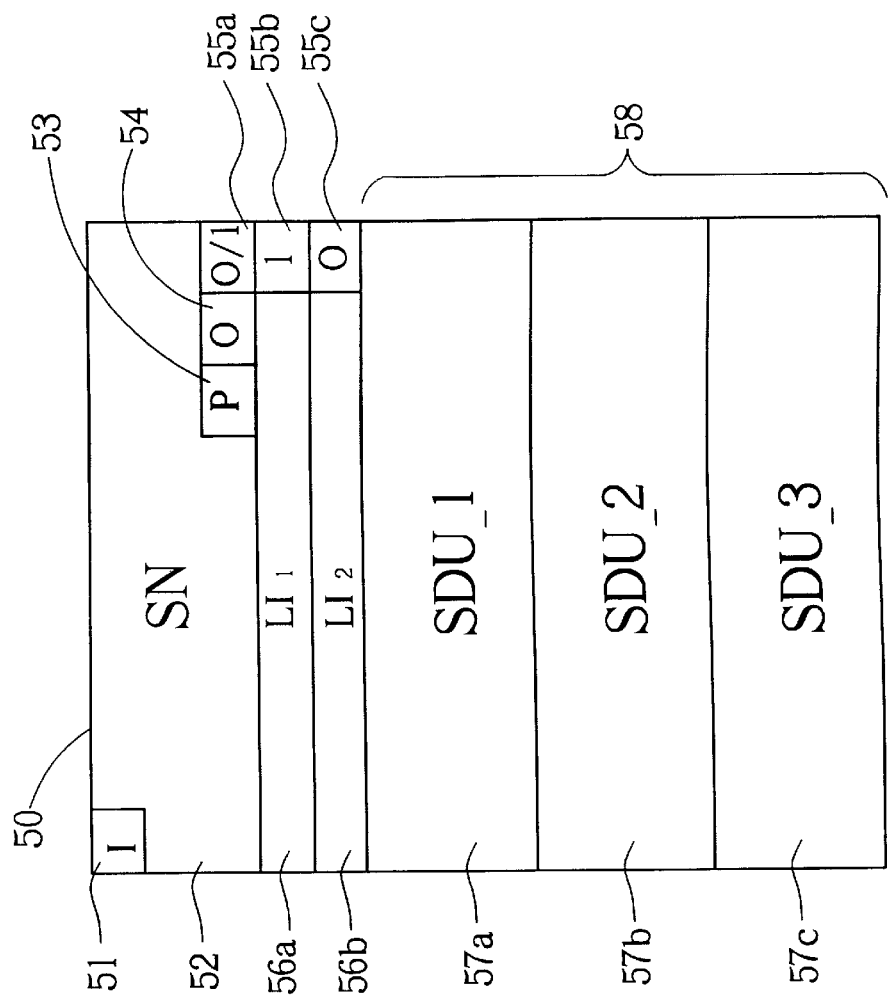
FIG. 3 is a block diagram of an acknowledged mode data (AMD) protocol data unit (PDU).
Figure 4:
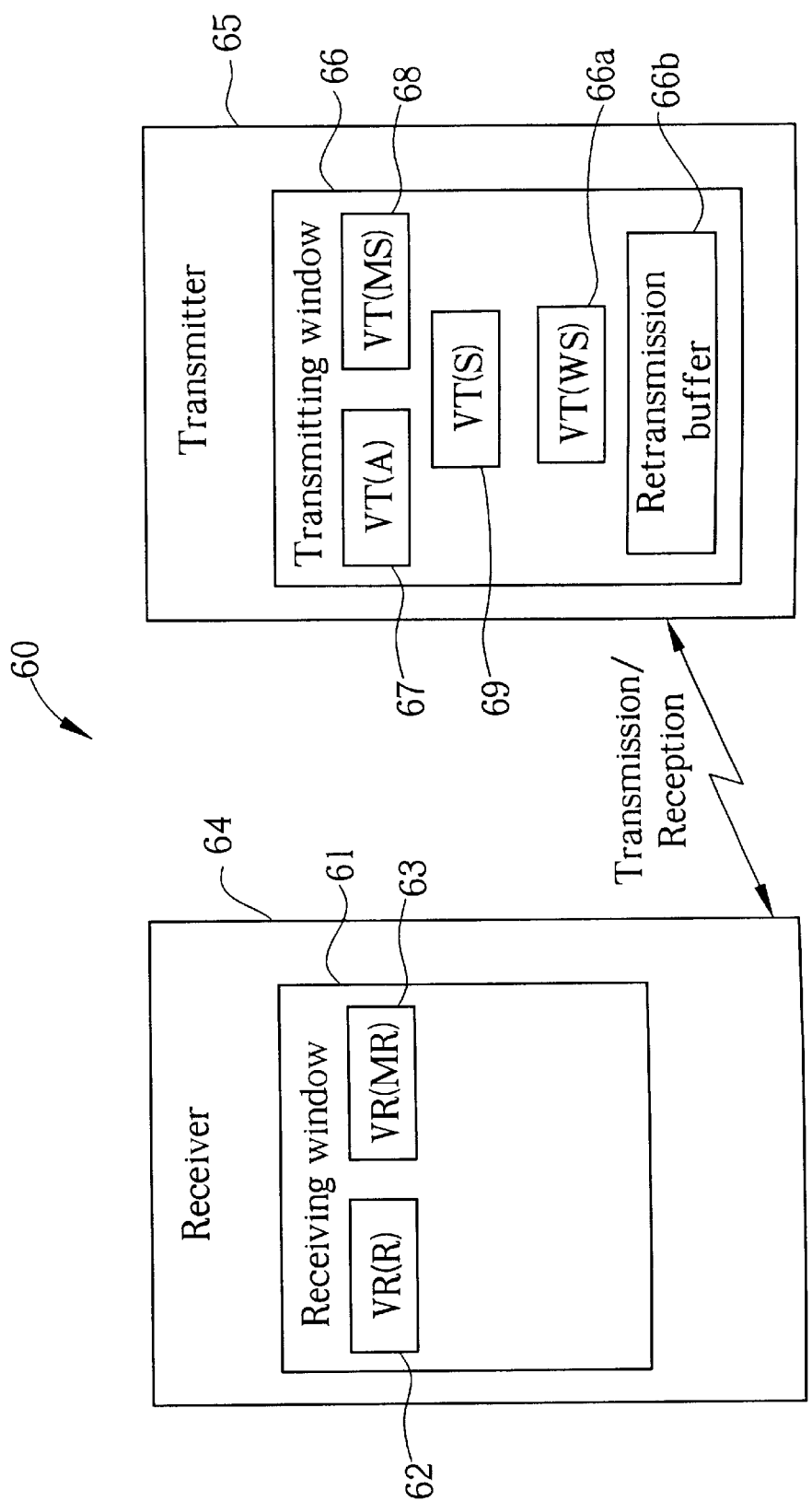
FIG. 4 is a simplified block diagram of a receiver and a transmitter in a wireless communications system.
Figure 5:
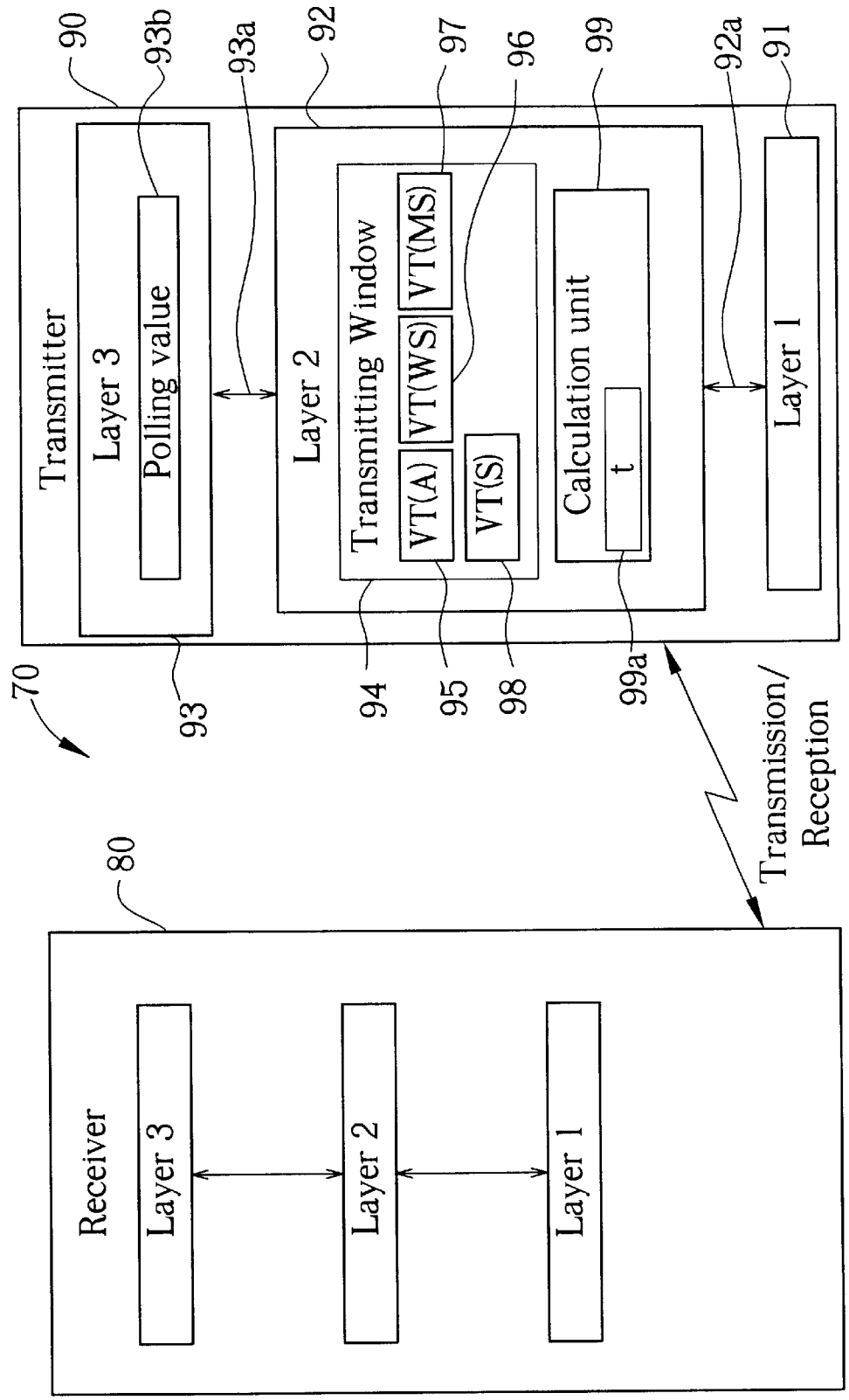
FIG. 5 is a simplified block diagram of a wireless communications system according to the present invention.

To better understand equation (4), please refer to FIG. 5. FIG. 5 is a simplified block diagram of a wireless communications system 70 that utilizes the method of the present invention. The wireless communication system 70 includes a receiver 80 and a transmitter 90. Both the transmitter 90 and the receiver 80 utilize a 3-tiered communications protocol. In the transmitter 90, a layer 3 interface 93 passes layer 2 service data units (SDUs) 93a to a layer 2 interface 92 for transmission. The layer 2 interface 92 composes the SDUs 93a into layer 2 protocol data units (PDUs) 92a that are passed to the layer 1 interface 91 for transmission. The PDUs 92a have a format that is identical to that discussed in the Description of the Prior Art, and thus need not be detailed any further here. In particular, though, each PDU 92a has an n-bit sequence number that identifies the sequential order of the PDU 92a in a stream of transmitted PDUs 92a. For the preferred embodiment, n is 12, and thus the sequence numbers for the PDUs 92a have a cyclical range from zero to 4095. Each PDU 92a also has a polling bit that may be set by the transmitter 90 to poll the receiver 80. As discussed in the prior art, the receiver 80 responds to a set polling bit with an acknowledgment status PDU so that the transmitter 90 may advance its transmitting window 94.

The transmitting window 94 is defined by state variables VT(A) 95, VT(WS) 96 and VT(MS) 97. The transmitter 90 will only transmit PDUs 92a with sequence numbers that are within the transmitting window 94. The state variable VT(A) 95 marks the beginning value of the transmitting window 94. The state variable VT(WS) 96 marks the size of the transmitting window 94, which is simply the number of sequence number values spanned by the transmitting window 94. The state variable VT(MS) 97 marks the end of the transmitting window 94, and is thus just the sum of VT(A) 95 and VT(WS) 96. Due to overflow, the value held within VT(MS) 97 need not be greater than a value held within VT(A) 95. Finally, a state variable VT(S) 98 holds the sequence number of a PDU 92a that is next in line to be transmitted. VT(S) 98 will always be sequentially on or after VT(A) 95, and sequentially on or before VT(MS) 97. The state variables VT(A) 95, VT(WS) 96, VT(MS) 97 and VT(S) 98 are identical in function to those discussed in the Description of the Prior Art.

The transmitter 90 also includes a calculation unit 99 that is used to calculate a test value t 99a. The value of t 99a is compared against a polling value 93b, that is supplied by the layer 3 interface 93, to determine if the transmitter 90 should poll the receiver 80. The polling bit is set in a subsequently transmitted PDU 92a if polling is to be performed. The test value t 99a is used for window-based polling, and to generate a value for t 99a, the calculation unit utilizes the state variables VT(A) 95, VT(WS) 96 and VT(S) 98, and equation (4). The polling value 93b indicates a transmission percentage of the transmitting window 94, i.e., the polling value 93b indicates the percentage of PDUs 92a in the transmitting window 94 that have been transmitted by the transmitter 90. If the value of t 99a exceeds the polling value 93b, then a polling request is triggered.

Figure 6:
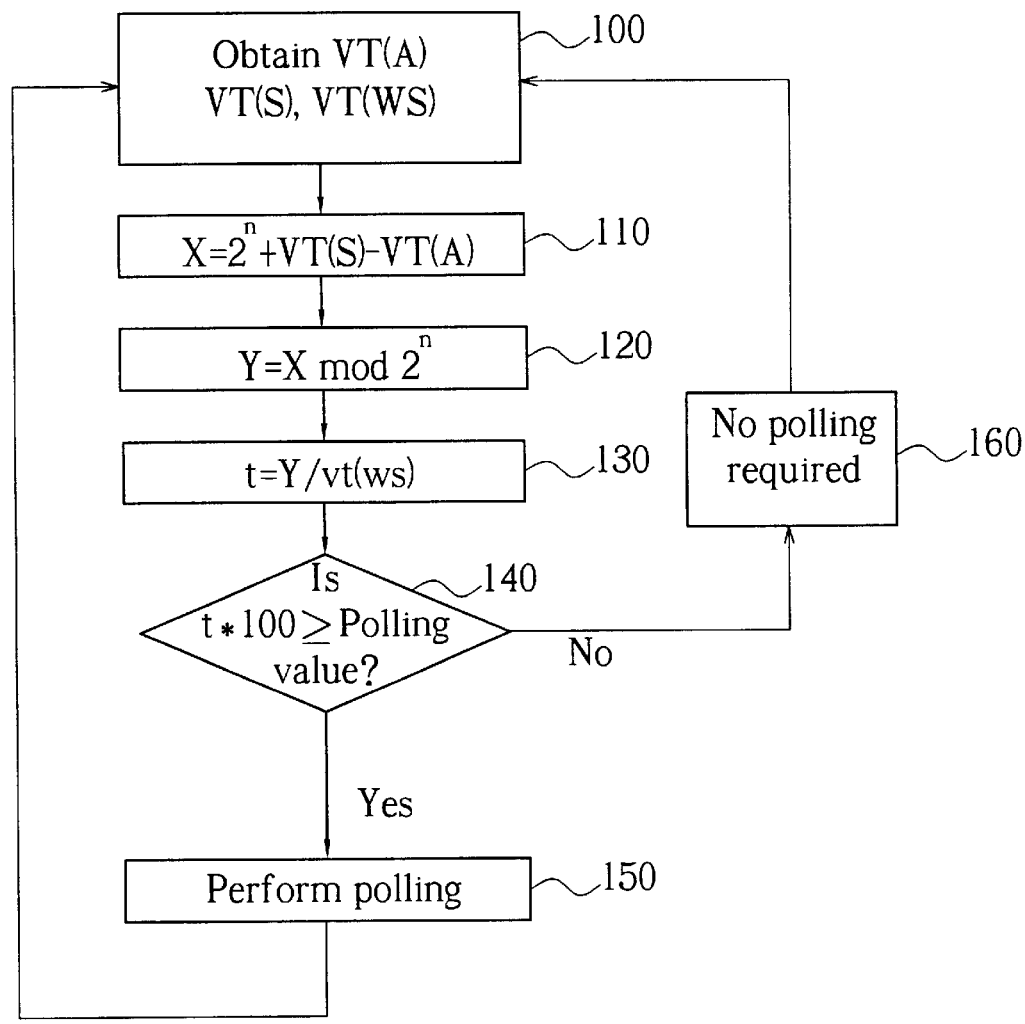
FIG. 6 is a flow chart of the method of the present invention.

Please refer to FIG. 6 with reference to FIG. 5. FIG. 6 is a flow chart of the method of the present invention, which is implemented by the calculation unit 99 to determine if polling should be triggered by the transmitter 90. The steps are explained below:

100: Obtain the current values for the transmitting window 94, which include the values from the state variables VT(A) 95, VT(WS) 96 and VT(S) 98.

110: A first value x is computed. The value x is $2^n$ added to the difference of the state variable VT(S) 98 and the state variable VT(A) 95. The value of n is the bit size of the sequence numbers for the PDUs 92a, and thus in the preferred embodiment is 12. Consequently, 4096 is added to VT(S)−VT(A).

120: A second value y is computed. The value of y is the modulus of the first value x with $2^n$. The second value y is thus x mod 4096.

130: The test value t 99a is obtained by dividing the second value y by the state variable VT(WS) 96. The test value t 99a indicates the current transmission percentage of the transmitting window 94 in fractional form.

140: Compare the test value t 99a to the polling value 93b. As the polling value is stored as a percentage in the form of zero to 100, the value of t 99a is multiplied by 100 to perform this comparison.

150: If the transmission percentage as represented by t 99a is greater than or equal to the polling value 93b, then polling is triggered for the transmitter 90. For the next PDU 92a to be transmitted or retransmitted, i.e., the PDU 92a with a sequence number value between the state variables VT(A) 94 and VT(S) 98, the polling bit is set. After transmission of this subsequent PDU 92a, the poll-triggering testing process is repeated.

160: If the transmission percentage as represented by t 99a is less than the polling value 93b, then no polling is required. For the next PDU 92a to be transmitted or retransmitted, i.e., the PDU 92a with a sequence value between the state variables VT(A) 94 and VT(S) 98, the polling bit is cleared. After transmission of this subsequent PDU 92a, the poll-triggering testing process is repeated.

The method of the present invention has the advantage that is accurately represents the transmission percentage of the transmission window 94. For example, using the example discussed in the Description of the Prior Art, consider the following case: VT(WS)=2, VT(MS)=2, and VT(S)=0. As VT(MS) is 2 and VT(WS) is 2, it follows that VT(A)=0, as VT(MS) =VT(A)+VT(WS). The transmission percentage should be zero. Using equation (4) yields:

$$t=\{(4096+0-0) \bmod 4096\}/2=0$$

This is exactly the value expected for the transmission percentage. Additionally, equation (4) works equally well when the state variable VT(MS) 97 is less than VT(S) 98, which occurs due to overflow.

It is possible for the value of t 99a to exceed 1.0. If this is undesirable, then equation (4) can be modified as follows:

$$t=\min\{((2^n+VT(S)-VT(A)) \bmod 2^n), VT(WS)\}/VT(WS) \quad (5)$$

In the above equation (5), "min" indicates the minimum value choosing operation, which returns the minimum value of its arguments. To implement equation (5), step 130 would perform a minimum value choosing operation between the second value y and the state variable VT(WS) 96 prior to dividing by VT(WS) 96. That is, the value of t 99a would be given by t=min(y, VT(WS))/VT(WS). Implementation of equation (5) has the benefit that equation (5) both accurately provides the transmission percentage of the transmitting window 94, and equation (5) will never exceed 1.0. Both equation (4) and equation (5) provide correct transmission percentages regardless of whether VT(S) 98 is greater than VT(A) 95, or VT(A) 95 is greater than VT(S) 98.

In contrast to the prior art, the present invention utilizes a calculation unit to compute a test value t according to the equations:

$$t=\min\{((2^n+VT(S)-VT(A)) \bmod 2^n), VT(WS)\}/VT(WS)$$

or $$t=\{(2^n+VT(S)-VT(A)) \bmod 2^n\}/VT(WS)$$

These above formulas accurately yield the transmission percentage of the transmitting window of the transmitter so that the transmitter will accurately trigger a polling request. This results in a more efficient wireless transmission system.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for determining triggering of a polling request in a wireless communications protocol for a transmitter, the transmitter capable of transmitting layer 2 protocol data units (PDUs), each PDU comprising an n-bit sequence number, the method comprising:

obtaining a base sequence number VT(A), the base sequence number VT(A) marking a beginning sequence number of a transmitting window of the transmitter;

obtaining a current sequence number VT(S), the current sequence number VT(S) marking a sequence number of a PDU that is next to be transmitted by the transmitter;

obtaining a first value that is $2^n$ added to a difference of the current sequence number VT(S) and the base sequence number VT(A);

obtaining a second value that is a modulus of the first value with $2^n$; and obtaining a test value that is the second value divided by a size of the transmitting window;

wherein polling is triggered when the test value is greater than or equal to a polling value.

2. The method of claim 1 wherein obtaining the second value further comprises a minimum value choosing operation with the size of the transmitting window.

3. The method of claim 1 wherein the polling value indicates a percentage of PDUs in the transmitting window that have been transmitted by the transmitter.

4. A wireless communications system comprising a transmitter capable of transmitting layer 2 protocol data units (PDUs) to a receiver, each PDU comprising an n-bit sequence number, the transmitter comprising:

a state variable VT(A) indicating a starting sequence number of a transmitting window;

a state variable VT(WS) indicating a number of PDUs spanned by the transmitting window;

a state variable VT(S) indicating a sequence number of a PDU within the transmitting window that is next to be transmitted; and a calculation unit capable of obtaining a test value t according to a relation that comprises:

$$t=((2^n+VT(S)-VT(A)) \bmod 2^n)/VT(WS);$$

wherein the transmitter polls the receiver when the test value t is greater than or equal to a polling value.

5. The system of claim 4 wherein the polling value indicates a percentage of PDUs in the transmitting window that have been transmitted by the transmitter.

6. A wireless communications system comprising a transmitter capable of transmitting layer 2 protocol data units (PDUs) to a receiver, each PDU comprising an n-bit sequence number, the transmitter comprising:

a state variable VT(A) indicating a starting sequence number of a transmitting window;

a state variable VT(WS) indicating a number of PDUs spanned by the transmitting window;

a state variable VT(S) indicating a sequence number of a PDU within the transmitting window that is next to be transmitted; and a calculation unit capable of obtaining a test value t according to a relation that comprises:

$$t=\min(((2^n+VT(S)-VT(A)) \bmod 2^n), VT(WS))/VT(WS);$$

wherein the transmitter polls the receiver when the test value t is greater than or equal to a polling value.

7. The system of claim 6 wherein the polling value indicates a percentage of PDUs in the transmitting window that have been transmitted by the transmitter.

* * * * *